DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 276

T904,027

AROMATIC POLYMERS

Terence Edwin Attwood, Kimpton, John Brewster Rose, Letchworth, and Alan Francis Lennox, Welwyn Garden City, England, assignors to Imperial Chemical Industries Limited, London, England

Filed Feb. 1, 1972, Ser. No. 222,698

Claims priority, application Great Britain, Feb. 4, 1971, 3,937/71

Int. Cl. C08g *23/00, 23/16*

U.S. Cl. 260—49

No Drawing. 8 Pages Specification

Aromatic polymers containing repeating units of monomers of naphthalene residues of the type:

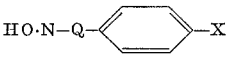

where N is a naphthalene group linked to the monomer chain in two ring positions, X is halogen, preferably fluorine or chlorine, and Q is $—SO_2—$ or —CO— and novel halophenyls of the formula:

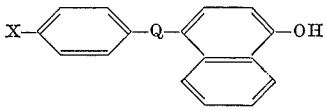

where X and Q are defined as above, are polymerized. The above monomers may be polymerized separately or copolymerized together, particularly when Q is $—SO_2—$, to form useful thermoplastic objects including moldings, fibers and films as well as surface coatings and adhesives. Polymerization is preferably accomplished using at least one of the above halophenyl compounds in the form of an alkali metal salt or by reaction of the halophenol compound in the presence of an alkali metal fluoride.